US012742872B2

(12) United States Patent
Sanson et al.

(10) Patent No.: US 12,742,872 B2
(45) Date of Patent: Sep. 22, 2026

(54) VELOCITY AND RANGE DISAMBIGUATION USING RADAR NETWORKS WITH WAVEFORM OPTIMIZATION

(71) Applicant: GM Cruise Holdings LLC, San Francisco, CA (US)

(72) Inventors: Jessica Bartholdy Sanson, Munich (DE); Johanna Gütlein-Holzer, Munich (DE); Andreas Barthelme, Gars (DE); Kalin Hristov Kabakchiev, Munich (DE); Andre Giere, Oberpframmern (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 320 days.

(21) Appl. No.: 18/461,488

(22) Filed: Sep. 5, 2023

(65) Prior Publication Data

US 2025/0052886 A1 Feb. 13, 2025

(30) Foreign Application Priority Data

Aug. 10, 2023 (EP) .................................... 23190923

(51) Int. Cl.
*G01S 13/58* (2006.01)
*G01S 7/35* (2006.01)
*G01S 13/931* (2020.01)

(52) U.S. Cl.
CPC ............ *G01S 13/584* (2013.01); *G01S 7/352* (2013.01); *G01S 13/589* (2013.01); *G01S 13/931* (2013.01)

(58) Field of Classification Search
CPC .... G01S 13/933; G01S 13/931; G01S 13/953; G01S 13/227; G01S 13/22; G01S 13/589
See application file for complete search history.

(56) References Cited

U.S. PATENT DOCUMENTS 4,954,830 A * 9/1990 Krikorian ............. G01S 13/225 342/137
5,027,122 A * 6/1991 Wieler .................. G01S 13/227 342/26 D (Continued)

OTHER PUBLICATIONS

Efficient Dealiasing of Doppler Velocities Using Local Environmental Constraints by Michael D. Ellis and Steven D Smith. Published Jan. 1989. (Year: 1989).*

(Continued)

*Primary Examiner* — Michael W Justice
(74) *Attorney, Agent, or Firm* — CANTOR COLBURN LLP

(57) ABSTRACT

A radar sensor system comprises a first radar sensor and at least a second radar sensor and one or more processors configured to assign different pulse rate intervals (PRI) to the first radar sensor and the second radar sensor. The processor (s) s are further configured to: receive ambiguous velocity estimates from the first and second radar sensors, respectively; determine maximum detectable velocity (Vmax) values for the first and second radar sensors based on their respective PRIs; generate a first velocity vector for the first radar sensor based on the first Vmax and the first ambiguous velocity estimate; generate a second velocity vector for the second radar sensor based on the second Vmax and the second ambiguous velocity estimate; compare velocity values in the first and second velocity vectors; and identify and output a velocity value common to the first and second velocity vectors as a correct unambiguous velocity of the object.

20 Claims, 13 Drawing Sheets

(56) References Cited

U.S. PATENT DOCUMENTS 5,302,955 A * 4/1994 Schutte .................. G01S 13/87 342/59
5,457,463 A * 10/1995 Vencel .................... G09B 9/54 342/170
5,977,905 A * 11/1999 Le Chevalier .......... G01S 13/53 342/136
6,218,983 B1 * 4/2001 Kerry .................... G01S 13/003 342/149
7,420,502 B2 * 9/2008 Hartzstein ............. H01Q 19/17 342/72
7,688,256 B2 * 3/2010 Finch .................. G01S 13/5246 342/194
8,077,074 B2 * 12/2011 Venkatachalam ..... G01S 13/878 342/134
8,704,703 B2 * 4/2014 Sanyal .................. G01S 13/003 342/134
9,244,164 B2 * 1/2016 Luebbert ................. G01S 13/22
9,547,078 B2 * 1/2017 Kuehnle ............... G01S 13/584
9,778,358 B2 * 10/2017 Selzler .................... G01S 13/95
9,835,723 B2 * 12/2017 Jansen .................. G01S 13/343
10,317,521 B2 * 6/2019 Li ......................... G01S 13/581
10,557,933 B2 * 2/2020 Kishigami .......... G01S 13/5242
11,214,143 B2 * 1/2022 Kim .................. B60K 31/0008
11,525,908 B2 * 12/2022 Laghezza .............. G01S 13/583
11,561,299 B1 * 1/2023 Hong ...................... G01S 13/72
11,693,112 B2 * 7/2023 Jones ...................... G01S 13/04 367/7
11,796,632 B2 * 10/2023 Wu ....................... G01S 13/584
12,066,520 B2 * 8/2024 Wu ......................... G01S 7/288
12,517,217 B2 * 1/2026 Lao .......................... G01S 7/35
2005/0285773 A1 * 12/2005 Hartzstein ............ H01Q 1/3233 342/107
2007/0013580 A1 * 1/2007 Finch .................. G01S 13/5246 342/194
2010/0079330 A1 * 4/2010 Venkatachalam ..... G01S 13/003 342/59
2012/0242530 A1 * 9/2012 Luebbert ................. G01S 13/48 342/70
2013/0044023 A1 * 2/2013 Sanyal .................. G01S 13/003 342/194
2014/0022111 A1 * 1/2014 Kuehnle ............... G01S 13/343 342/109
2015/0084805 A1 * 3/2015 Dawber .................. G01S 13/28 342/28
2016/0124086 A1 * 5/2016 Jansen .................. G01S 13/931 342/107
2016/0306039 A1 * 10/2016 Selzler .................. G01S 13/288
2017/0299711 A1 * 10/2017 Kishigami .......... G01S 13/5242
2017/0363715 A1 * 12/2017 Li ......................... G01S 13/581
2018/0172813 A1 6/2018 Rao et al.
2018/0319280 A1 * 11/2018 Kim .................. B60K 31/0008
2021/0255303 A1 * 8/2021 Laghezza .............. G01S 13/581
2022/0099817 A1 3/2022 Crouch et al.
2022/0334240 A1 * 10/2022 Wu ....................... G01S 13/582
2023/0092131 A1 * 3/2023 Lao .......................... G01S 7/35 342/200
2023/0393261 A1 * 12/2023 Hong ...................... G01S 13/72
2026/0009879 A1 * 1/2026 Jagannath ............... G01S 7/006

OTHER PUBLICATIONS

Maximum Unambiguous Range from the radartutorial.eu. Website https://www.radartutorial.eu/01.basics/Maximum%20Unambiguous%20Range.en.html (Year: 2023).*

Extended European Search Report for European Application No. 23190923.5, Date of Mailing Feb. 5, 2024, 9 pages.

Grebner Timo et al: "Instantaneous Ego-Motion Estimation based on Ambiguous Velocity Information within a Network of Radar Sensors", 2022 14th German Microwave Conference (GEMIC), IMA, May 16, 2022 (May 16, 2022), pp. 140-143.

* cited by examiner

VELOCITY AND RANGE DISAMBIGUATION USING RADAR NETWORKS WITH WAVEFORM OPTIMIZATION

RELATED APPLICATION

This application claims priority to European Patent Application No. 23190923.5, filed on Aug. 10, 2023, and entitled "VELOCITY AND RANGE DISAMBIGUATION USING RADAR NETWORKS WITH WAVEFORM OPTIMIZATION". The entirety of this application is incorporated herein by reference.

BACKGROUND

Autonomous or assisted driving strategies have been facilitated through sensing an environment around a vehicle. Radar sensors are conventionally used in connection with detecting and classifying objects in an environment; advantages of radar over other types of sensors (such as cameras or lidar) include robustness in regard to lighting and weather conditions. Often, radar sensors are deployed with cameras and/or lidar sensors to provide different modes of detection and redundancy. In certain scenarios, performance of lidar and/or cameras is negatively impacted by environmental features, such as fog, rain, snow, bright sunlight, lack of adequate light, etc. Accordingly, in these scenarios, radar is relied heavily upon to detect and classify objects in the environment, while lidar and camera sensors are less heavily relied upon.

In connection with navigating an environment, an autonomous vehicle perceives objects surrounding the autonomous vehicle based upon sensor signals generated by sensor systems of the autonomous vehicle. For example, the autonomous vehicle may include a sensor system, such as a radar sensor system, for generating sensor signals. The autonomous vehicle also includes a centralized processing device that receives data based upon sensor signals generated by the sensor system and performs a variety of different tasks, such as detection of vehicles, pedestrians, and other objects. Based on an output of the processing device, the autonomous vehicle may perform a driving maneuver.

Radar sensor systems exhibit some advantages over other sensor systems such as lidar sensor systems and cameras with respect to their usage in autonomous vehicles. For instance, compared to cameras and lidar sensor systems, performance of radar sensor systems is more invariant to weather changes, such that data generated by a radar sensor system can be used to enable autonomous driving under certain weather conditions (such as heavy rain or snow). In addition, radar sensor systems are able to capture velocity information nearly instantaneously. Further, radar sensor systems have a greater range than cameras and lidar sensor systems.

Radar sensor systems emit radar signals into a surrounding environment. The radar sensor signals reflect off objects in the environment and the radar sensor system then detects the reflected radar signals. Conventionally, the radar sensor system is configured to construct data tensors based upon the reflected radar signals, where a data tensor has bins across several dimensions. Example dimensions include range, doppler, and beam. The radar sensor system then generates point clouds based upon the data tensors and transmits the point clouds to the centralized processing device, where the centralized processing device identifies objects in the environment of the autonomous vehicle based upon the point clouds.

Range resolution of a radar sensor system is a function of the bandwidth of a radar signal transmitted by the radar sensor system. All else being equal, employing a wider bandwidth radar signal to be transmitted by the radar sensor system generally provides a finer range resolution (as compared to range resolution provided by a radar sensor system that utilizes a narrower bandwidth radar signal). In various applications, such as radar sensor systems of vehicles (e.g., autonomous vehicles), it is desired to have relatively fine range resolution; thus, such systems commonly employ relatively wide bandwidth radar signals.

However, as bandwidth of radar signals to be transmitted by conventional radar sensor systems increases, unambiguous velocity detectable by such radar sensor systems typically decreases. A relatively low pulse repetition interval (PRI) can generally allow for a relatively high unambiguous velocity. Yet, as noted above, relatively wider bandwidth radar signals are utilized to achieve finer range resolutions. Due to limitations of analog to digital converter (ADC) sampling rates, increasing the bandwidth of the radar signals can result in increasing the PRI of the radar signals, which in turn decreases the unambiguous velocity. Thus, due to hardware limitations, conventional radar sensor systems oftentimes are unable to provide relatively fine range and angular resolution while also providing relatively high unambiguous velocity.

SUMMARY

The following is a brief summary of subject matter that is described in greater detail herein. This summary is not intended to be limiting as to the scope of the claims.

Described herein are various technologies relating to radar sensor systems, and more specifically, radar sensor systems employed in autonomous vehicles, aircrafts, watercrafts, and the like. With more particularity, various technologies described herein facilitate mitigating unambiguous velocity and range limitations relative to a single radar through a joint waveform optimization on multiple radars in a network, which facilitates estimating velocity and/or range in any common field of view (FOV) shared by at least two radars in the network. The described techniques can also be applied in distributed aperture radars, where joint waveform optimization is performed using the transmit antennas of the distributed array. The techniques are also applicable to MIMO radar sensors, independent of modulation and antenna design. The implementation can be based in point cloud data or radar raw data using centralized processing.

The described techniques are based on simultaneous and/or orthogonal transmissions between a network's radars, where each radar has different waveform parameters (such as PRI or number of samples), so that different ambiguous values of range and/or velocity are obtained by each radar. Through the association of velocity values common to both velocity vectors, it is possible to estimate the correct unambiguous value of the velocity and/or range in one time frame of the target in the common FOV of at least two radars.

The described systems and methods can use raw radar data or point cloud data generated by the radar sensors. In the case of point cloud transmission over the network: when disambiguation is performed at the point cloud level (without clustering and object detection having been implemented), detections that have been estimated in all radar units in the same doppler and range cell can be disambiguated. In the case of transmission of raw radar data: to reduce the data transmitted to the central unit, a pre-estimation of the targets can be carried out on each radar and thus only the data with information of interest need be transmitted.

Signals transmitted between radars do not need to be completely synchronized in time, and the transmission time difference between radars can be set to be less than the possible range/doppler migration of targets during measurement. This technique can also be implemented in a distributed aperture radar network, where receive antenna(s) and transmit antenna(s) from different radars are used in beamforming for increased angle resolution, such that each radar in the network can detect different ambiguous values. The disambiguation can be performed before or during the beamforming process. With the exception of ambiguous values, the other parameters of the radars (such as resolution for example) remain the same or substantially the same to facilitate the association of the detections of each radar.

In the event that one of the radars does not detect the target, the radars can oscillate between the different PRIs in each frame so that in the event of a miss, the subsequent frame of the same radar or another radar can be used for disambiguation.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
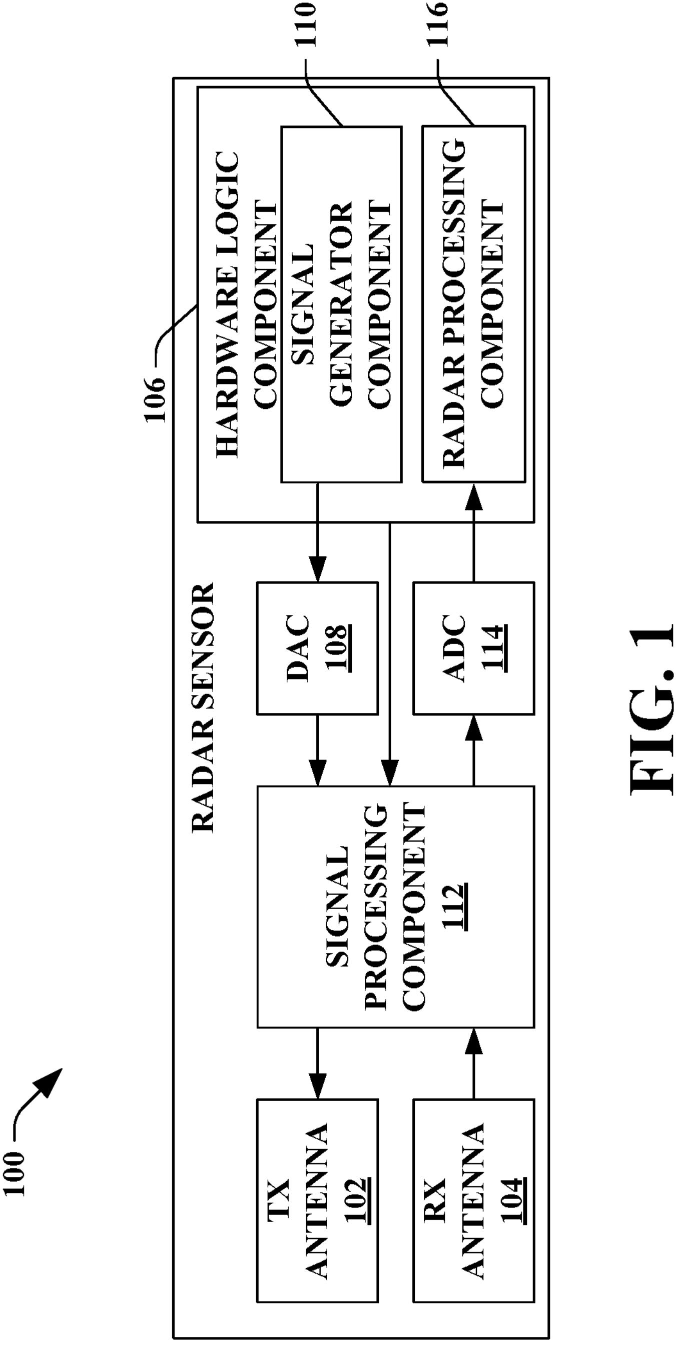
FIG. 1 is a functional block diagram of an exemplary radar sensor.

Various technologies pertaining to autonomous vehicle (and other) radar sensor systems are described herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Examples set forth herein pertain to an autonomous vehicle including a radar sensor system that disambiguates velocity utilizing the techniques set forth herein. It is to be understood, however, that the radar sensor system described herein can be employed in a variety of different scenarios, such as flight, in drone technologies, in monitoring technologies (e.g., security technologies), and so forth. Autonomous vehicles are set forth herein as one possible use case and features of the claims are not to be limited to autonomous vehicles unless such claims explicitly recite an autonomous vehicle.

Automotive radar sensor systems require high range and doppler resolution together with high ambiguous range and velocity. Achieving a high range and angular resolution simultaneously with high unambiguous velocity in frequency modulated continuous wave (FMCW) radars is a significant challenge due to hardware limitations. High range resolution involves higher ramp bandwidth, and the high unambiguous velocity span requires a low pulse repetition interval (PRI). The ambiguous velocity estimation is then compromised in exchange for achieving high range resolutions, due to limitations associated with a high ADC sampling rate.

Unambiguous range/velocity estimation is also limited in digitally modulated radars based on stepped modulation (such as stepped carrier orthogonal frequency division modulated (OFDM) radars), where achieving a high unambiguous velocity (low PRI) can require high processing power, thereby complicating its implementation. Moreover, high range resolutions make it difficult to achieve high unambiguous range.

To overcome these problems and others, the described aspects provide techniques for determining unambiguous velocity and range by performing instantaneous velocity and range estimation at velocities and ranges multiple times higher (or lower) than the unambiguous value of the radar through the use of radar networks. Using radar network waveform optimization, the values of velocity and range can be correctly estimated (disambiguation) in the common field of view between at least two radars in the network. The described systems and methods are applicable for multiple input-multiple output (MIMO) radar sensors, independent of modulation and antenna design. The implementation can be based in point cloud (e.g., a radar tensor) or raw radar data with centralized processing and can also be applied in distributed aperture radars.

Thus, a radar network with centralized processing and comprising coherent or non-coherent radars is provided, wherein respective MIMO radars transmit and receive only their own respective signals. In one embodiment, the received signal in each radar has some steps processed in the radar itself (e.g., range, doppler, angle, etc.), and then the data is transmitted to the central unit to disambiguate the velocity and/or range of the detections.

With reference now to FIG. 1, an exemplary radar sensor (also referred to as a radar sensor system) 100 is illustrated, in which various features, circuits, etc. described herein can be employed. The radar sensor 100 includes a transmit antenna 102, a receive antenna 104, and a hardware logic component 106. While one transmit antenna 102 and one receive antenna 104 are depicted in FIG. 1, it is contemplated that the radar sensor system 100 can include substantially any number or transmit antennas (each substantially similar to the transmit antenna 102) and/or substantially any number of receive antennas (each substantially similar to receive antenna 104). The hardware logic component 106 is configured to prepare radar signals that are transmitted by the transmit antenna 102, and to compute target solutions indicating estimated positions and/or velocities of objects based upon radar returns received by the receive antenna 104. In exemplary embodiments, various components of the radar sensor 100 can be integrated as a same system-on-a-chip (SoC). According to other embodiments, one or more components of the radar sensor system 100 can be discrete component(s). In various embodiments, the radar sensor 100 can be employed on a vehicle, such as a land vehicle, an aircraft, to identify positions and velocities of objects in the operational environment of the vehicle.

The radar sensor 100 further comprises one or more digital to analog converters (DACs) 108. The hardware logic component 106 comprises a signal generator component 110 that prepares radar signals for transmission by way of the transmit antenna 102. The signal generator component 110 is configured to control the DAC 108 to cause the DAC 108 to generate an analog radar signal for transmission by the transmit antenna 102. In other words, the signal generator component 110 generates digital values that, when received by the DAC 108, cause the DAC 108 to output an analog radar signal having various desired signal characteristics. Hence, the radar sensor 100 is configured as a digitally modulated radar sensor, wherein characteristics of radar signals output by the transmit antenna 102 are digitally controlled by the signal generator component 110 of the hardware logic component 106. For example, the signal generator component 110 can be configured to control the DAC 108 such that the radar sensor operates as a phase modulated continuous wave (PMCW) radar sensor.

The radar signal generated by the signal generator component 110 can be an analog signal having various desired signal characteristics. For example, the radar signal generated by the signal generator component 110 can be a frequency modulated continuous wave (FMCW) radar signal. Following this example, the signal generator component 110 can control characteristics of the FMCW radar signal such as pulse shape, bandwidth of a pulse, pulse repetition interval (PRI), period of a pulse (e.g., period of a ramp), slope of a pulse, start frequency of a pulse, and the like. While many of the examples set forth herein describe the radar signal as being an FMCW radar signal, it is to be appreciated that these examples can be extended to other types of radar signals transmitted in steps, linear ramps, etc. (e.g., stepped orthogonal frequency division multiplexing (OFDM) radar, stepped phase modulated continuous wave (PMCW) radar, etc.). For instance, unambiguous velocity can similarly be limited in radar sensor systems that digitally modulate the radar signal based on stepped modulation, such as stepped carrier OFDM radar; thus, the examples set forth herein can be extended to the radar signal generated by the signal generator 110 being an OFDM radar signal in other embodiments.

The radar sensor 100 further includes an analog signal processing component 112. The signal processing component 112 is generally configured to perform various analog signal processing operations on analog signals that are to be output by the transmit antenna 102 and/or that are received by the receive antenna 104. By way of example, and not limitation, the signal processing component 112 can amplify a radar signal output by the DAC 108 to increase the power of the radar signal prior to transmission by way of the transmit antenna 102. In a further example, the signal processing component 112 can be configured to mix a radar signal output by the DAC 108 with a carrier signal to shift a center frequency of the radar signal. The signal processing component 112 can include any of various components that are configured to perform these various functions. For example, the signal processing component 112 can include mixers, amplifiers, filters, or the like. Functionality of the signal processing component 112 and its constituent components can be controlled by the hardware logic component 106. The transmit antenna 102 receives processed radar signals from the signal processing component 112 and emits the radar signals into an operational environment of the radar sensor 100.

The receive antenna 104 receives radar returns from the operational environment. In exemplary embodiments, the radar returns received by the receive antenna 104 comprise reflections, from objects in the operational environment of the sensor 100, of radar signals emitted by the transmit antenna 102. It is to be understood that the radar returns received by the receive antenna 104 can further include reflections of radar signals emitted by other radar emitters that are active within the operational environment of the radar sensor 100. Responsive to receipt of radar returns from the operational environment of the sensor 100, the receive antenna 104 outputs an electrical signal that is indicative of the received radar returns. This electrical signal is referred to herein as a radar signal and is transmitted along one or more transmission lines in the radar sensor 100, as distinct from radar returns that are received by the receive antenna 104 as radiated signals propagating through air or free space in the operational environment of the radar sensor 100.

The signal processing component 112 receives a radar signal from the receive antenna 104. The signal processing component 112 is configured to perform various analog signal processing operations over radar signals received from the receive antenna 104. By way of example, and not limitation, the signal processing component 112 can perform various mixing, filtering, and amplification operations on radar signals output by the receive antenna 104. The signal processing component 112 can be configured to perform various of these signal processing operations (e.g., mixing) based further upon a radar signal transmitted by the transmit antenna 102.

The radar sensor 100 further comprises one or more analog to digital converters (ADCs) 114 that receives a processed radar signal from the signal processing component 112. The ADC 114 digitally samples the radar signal and outputs digital values that are indicative of amplitude of the radar signal over time. These digital values are collectively referred to herein as radar data. The radar data output by the ADC 114 are indicative of the radar returns received by the receive antenna 104.

The hardware logic component 106 receives the radar data from the ADC 114. The hardware logic component 106 further comprises a radar processing component 116. The radar processing component 116 is configured to compute positions and/or velocities of targets in the operational environment of the radar sensor 100 based upon the radar data. In a non-limiting example, the radar processing component 116 can compute a range, a bearing, and/or a velocity of a target in the operational environment of the sensor 100 based upon the radar data.

Figure 2:
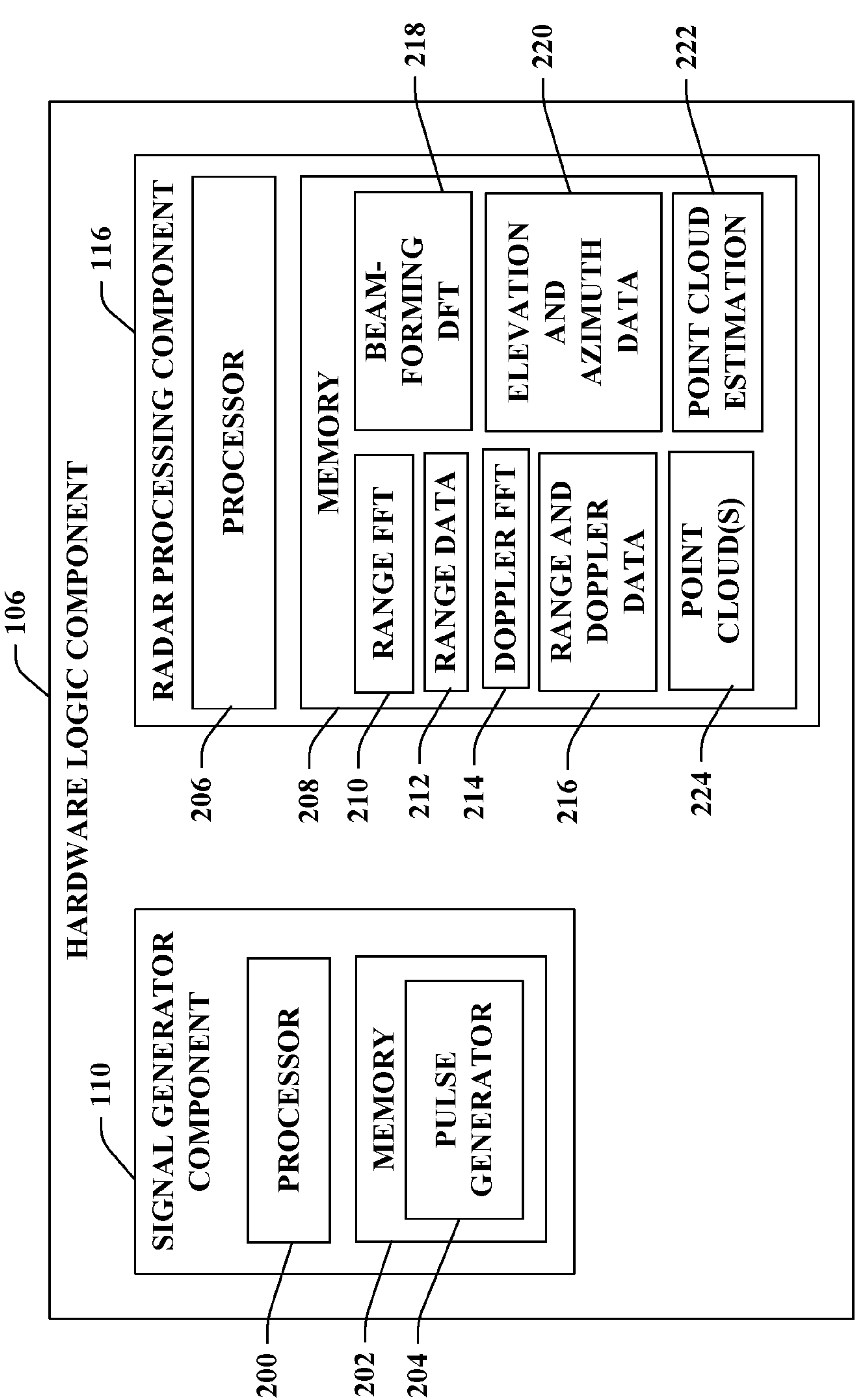
FIG. 2 illustrates a more detailed view of the hardware logic component.

With reference now to FIG. 2, a more detailed view of the hardware logic component 106 is illustrated. The hardware logic component 106 comprises the signal generator component 110 and the radar processing component 116, as discussed with regard to FIG. 1. The signal generator component 110 comprises a processor 200 and a memory 202 configured to provide certain functionality as described herein. For example, the memory 202 can store computer-executable instructions that, when executed by the processor 200, cause the signal generator component 110 to perform certain acts. The memory 202 comprises a ramp/pulse generator component 204 that generates ramps/pulses (depending on the type of radar sensor system) for transmission. In one embodiment, the ramp/pulse generator component 204 performs time division multiplexing and/or frequency division multiplexing on the signals to be transmitted.

The radar processing component 116 comprises a processor 206 and a memory 208 configured to provide certain functionality as described herein. For example, the memory 208 can store computer executable instructions that, when executed by the processor 206, cause the radar processing component 116 to perform certain acts. The memory 208 comprises a range fast Fourier transform (FFT) component 210 that is executed on a digitized signal received from an ADC, such as the ADC 114 of FIG. 1, to generate range data 212 for objects detected in a received radar return. A Doppler FFT 214 is executed on the range data to generate range and Doppler data 216. A discrete Fourier transform (DFT) 218 is then executed on the range and Doppler data to generate elevation and azimuth data 220. A point cloud estimation component 222 is executed to generate one or more point clouds 224 representing at least the range data 212, the range and Doppler (velocity) data 216, and the elevation and azimuth data 220. However, it will be appreciated that the point cloud is not limited to representing only these data types. Rather, the point cloud can also include data points representing other data types, including but not limited to point density data, radar cross-section (RCS) data, etc.).

Figure 3:
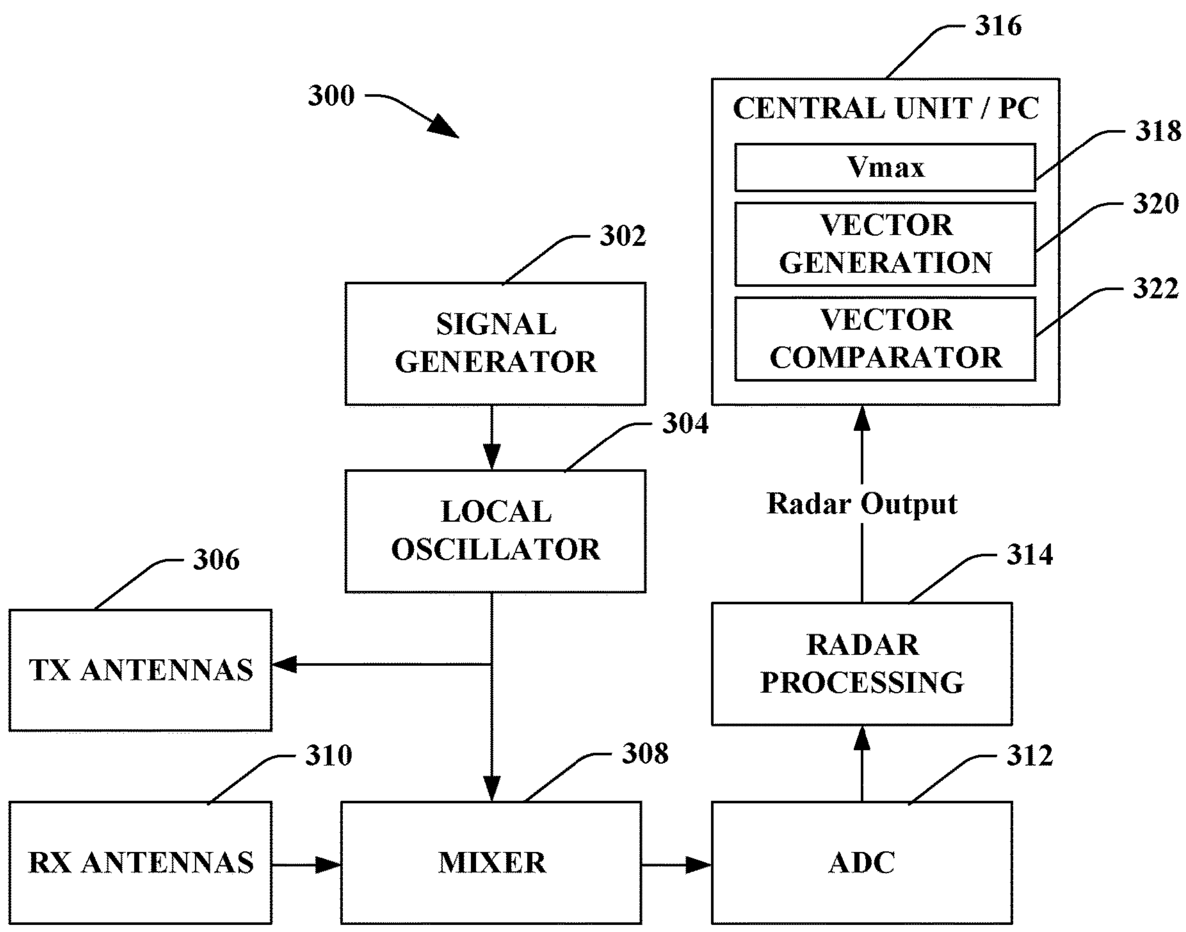
FIG. 3 shows another example of a radar sensor unit.

FIG. 3 shows another example of a radar sensor unit 300. The sensor 300 comprises a signal generator 302 that provides a signal to a local oscillator 304. The local oscillator 304 adjusts the signal for transmission via one or more transmit antennas 306. The local oscillator 304 also provides the transmit signal to a mixer 308, which combines the transmit signal with signals that have been reflected by an object and received by one or more receive antennas 310. The combined signal is then provided by the mixer 308 to an ADC 312, which digitizes the combined signal and provides the digitized signal to a radar processing component 314.

The radar processing component 314 performs various acts on the digitized signal and provides functionality similar or identical to the functionality provided by the radar processing component 116 of the hardware logic component 106 (see, e.g., FIGS. 1 and 2). The radar processing component 314 generates one or more point clouds, which are then transmitted to a central processing unit or computer (PC) 316 for velocity and/or range disambiguation.

The central unit 316 comprises a Vmax determination component 318 that determines a maximum ambiguous velocity for each radar based on the different PRIs assigned to the respective radars, where PRI is inversely proportional to Vmax. For example, the central unit 316 can receive raw data or point cloud data from two MIMO radar units (Radar1 and Radar2) having overlapping FOVs. Radar1 has a PRI (PRI T1) that is smaller than the PRI (PRI T2) of Radar2, and therefore Radar1 has a higher Vmax (Vmax1).

In one embodiment, the radar network comprises two or more radars (e.g., MIMO radars) and the central unit 316. Each radar in the network has an optimized waveform so that the radars can detect either different unambiguous velocity (different PRIs), or different unambiguous range, or different unambiguous range and velocity. The radars can employ orthogonal waveforms so that they can transmit at the same time or with a transmission time difference smaller than the time required for a target to migrate in a range cell. After receiving its own signal, each radar processes the signal and transmits a point cloud, or transmits raw radar data (e.g., such as range and doppler) to the central unit 316. The central unit receives data from both radars and performs the disambiguation process.

According to an example, the central unit 316 assigns PRI T1 to Radar1 and PRI T2 to Radar 2, where PRI T2 is 11% higher than PRI T1. This results in Radar2 having a Vmax (Vmax2) that is 90% of the Vmax1 of Radar1. For instance, if Radar1 has a Vmax1 of 20 m/s, Radar2 has a Vmax2 of 18 m/s according to this example. It will be understood that the differences between the PRIs and Vmax(s) of Radar1 and Radar2 are illustrative in nature and not to be construed in a limiting manner.

A vector generation component 320 is provided that generates a velocity vector for each radar based on the determined Vmax for the radar and an object velocity detected the radar. For Radar1, the span of detectable Vmax is 40 m/s, since it spans from −20 m/s to +20 m/s. Similarly, For Radar2, the span of detectable Vmax is 36 m/s, since it spans from −18 m/s to +18 m/s.

If Radar1 detects the velocity of the object at −17 m/s, the vector generator component generates a vector comprising velocity values that are 40 m/s apart and centered on −17 m/s, such that:

Vector VtargetRadar1=[ . . . ,−57 m/s,−17 m/s,23 m/s,63 m/s, . . . ]

If Radar2 detects the object at −15 m/s, then the vector generation component 320 generates a vector comprising velocity values that are 36 m/s apart and centered on −13 m/s, such that:

Vector VtargetRadar2=[ . . . ,−49 m/s,−13 m/s,23 m/s,59 m/s, . . . ]

A velocity comparator component 322 compares the vector velocity possibilities and identifies a velocity value that is common to both radars' vectors (in this case, 23 m/s) as the unambiguous velocity of the object. Thus, a comparison with all ambiguous speed possibilities is made to find the common speed estimate (correct value) between the two radars. This association (disambiguation) can be made with the point cloud or with raw radar data. With raw data radar, the disambiguation can be done at any stage after doppler estimation, for example before or after beamforming. The disambiguation can also be performed coherently (e.g., in the case of distributed aperture) or non-coherently (e.g., only with magnitude).

Figure 4:
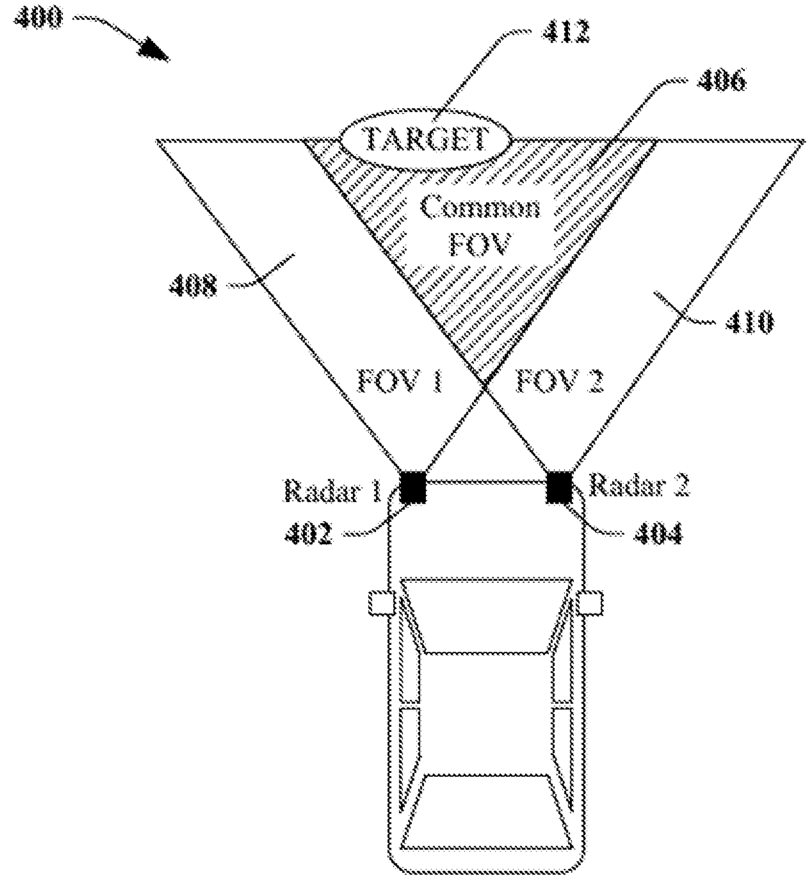
FIG. 4 illustrates a radar network comprising at least two MIMO radars with a common FOV 406.

FIG. 4 illustrates a radar network 400 comprising at least two MIMO radars 402, 404 with a common FOV 406, wherein the radars 402, 404 can be coherent or non-coherent radars. The common FOV 406 represents an area of overlap of the FOV 408 of the first radar 402 with the FOV 410 of the second radar 404. A target object 412 is also shown passing through the common FOV 406.

In one embodiment, the signal received at the central unit/PC (not shown in FIG. 4, see FIG. 3) is already processed by each radar 402, 404 (point cloud estimation). In another embodiment, the raw data of each radar 402, 404 can be sent to the central unit/PC, and central processing is performed by the central unit/PC. In yet another embodiment, one radar can send processed point cloud data while the other transmits raw data for processing by the central unit. Moreover, the signal received from each radar can be merged into a single signal using beamforming, resulting in aperture/resolution equivalent to the total space/distance between the two sensors.

The technique is based on simultaneous and orthogonal transmissions in the at least two radars 402, 404, where each radar has different waveform parameters (such as PRI for velocity disambiguation or number of samples for range disambiguation), so that different ambiguous values of velocity and/or range are obtained in each radar. Through an association of velocity (and/or range) possibilities, it is possible to estimate the correct value of the velocity and/or range of the target 412 in the common FOV 406 using only one radar time frame.

Figure 5:
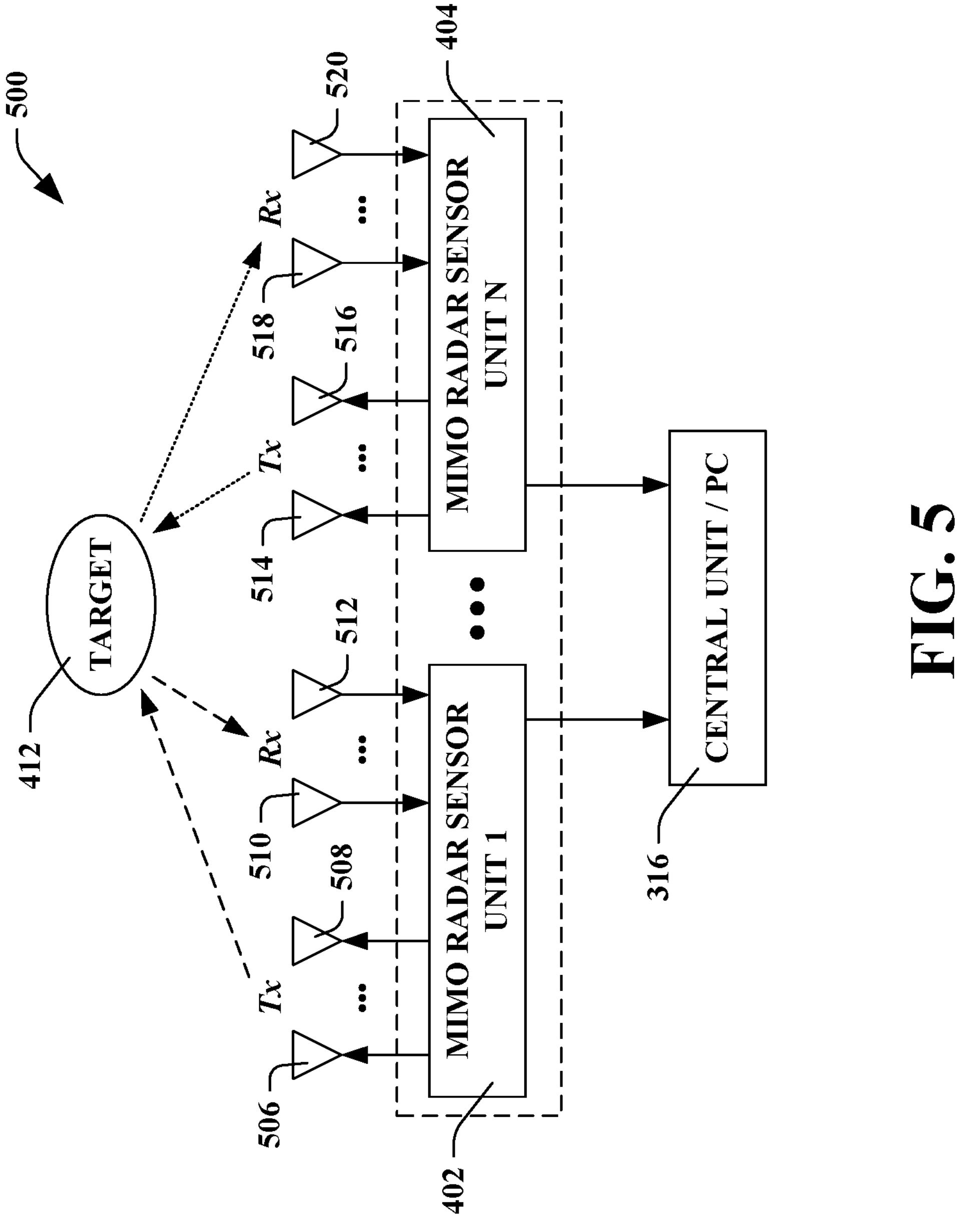
FIG. 5 is an illustration of a radar network such as may be employed in conjunction with various features described herein.
Figure 6:
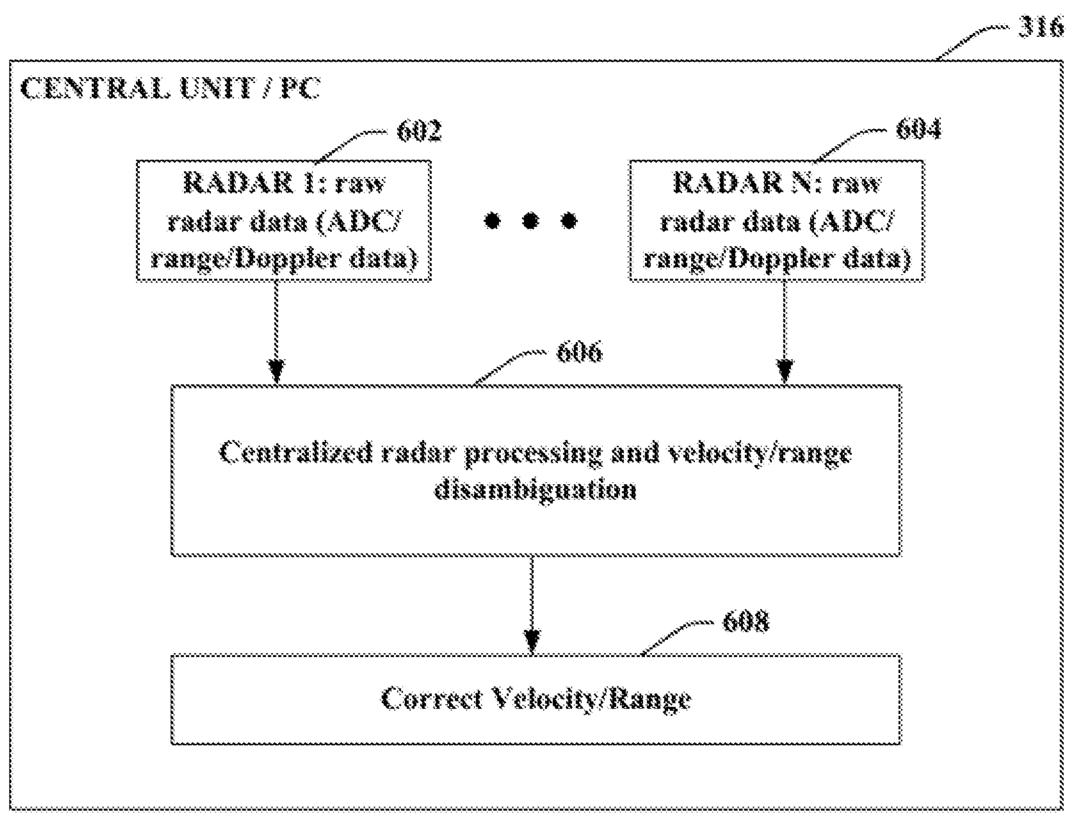
FIG. 6 illustrates an example of the processing performed by the central unit.

FIG. 5 is an illustration of a radar network 500 such as may be employed in conjunction with various features described herein. The radar network 500 comprises a first MIMO radar sensor unit 502 through an Nth radar sensor unit 504 (wherein N is an integer greater than 1), that provide one or both of point cloud data or raw data to a central unit 316. The first MIMO Radar sensor unit 502 comprises a plurality of transmit antennas 506, 508, and a plurality of receive antennas 510, 512. Similarly, the Nth MIMO radar sensor unit 504 comprises a plurality of transmit antennas 514, 516, and a plurality of receive antennas 518, 520. Transmit antennas 506, 508 transmit a signal having a first PRI that is assigned to the first MIMO radar sensor unit 502, the signal being reflected by a target 522, and the reflected signal being received by the plurality of receive antennas 510, 512. Transmit antennas 514, 516 transmit a signal having a second PRI that is assigned to the second MIMO radar sensor unit 504, the signal being reflected by the target 522, and the reflected signal being received by the plurality of receive antennas 518, 520.

In one embodiment, the MIMO radar sensor units 502, 504 transmit raw radar data to the central unit 316 for processing and velocity and/or range disambiguation. In another embodiment, the MIMO radar sensor units 502, 504 process the received signals and generate respective point clouds including at least velocity and range data, which are transmitted to the central unit 316 for velocity and/or range disambiguation.

With continued reference to FIGS. 1-5, FIG. 6 illustrates an example of the processing performed by the central unit 316. Raw radar data 602 and 604 from respective radars 1 through N (see FIG. 5) has been received. The raw radar data can comprise, for example, data from the ADCs of the respective radar sensors, as well as range and Doppler data from the respective radar sensors. At 606, centralized radar processing and velocity and/or range disambiguation are performed by the central unit 316 by comparing values in the respective radars' vectors and identifying a value common to both radars' velocity vectors or range vectors. In a distributed aperture radar network, the disambiguation can be applied before the angle estimation. At 608, the correct velocity and/or range is output via the vector comparison described herein.

Figure 7:
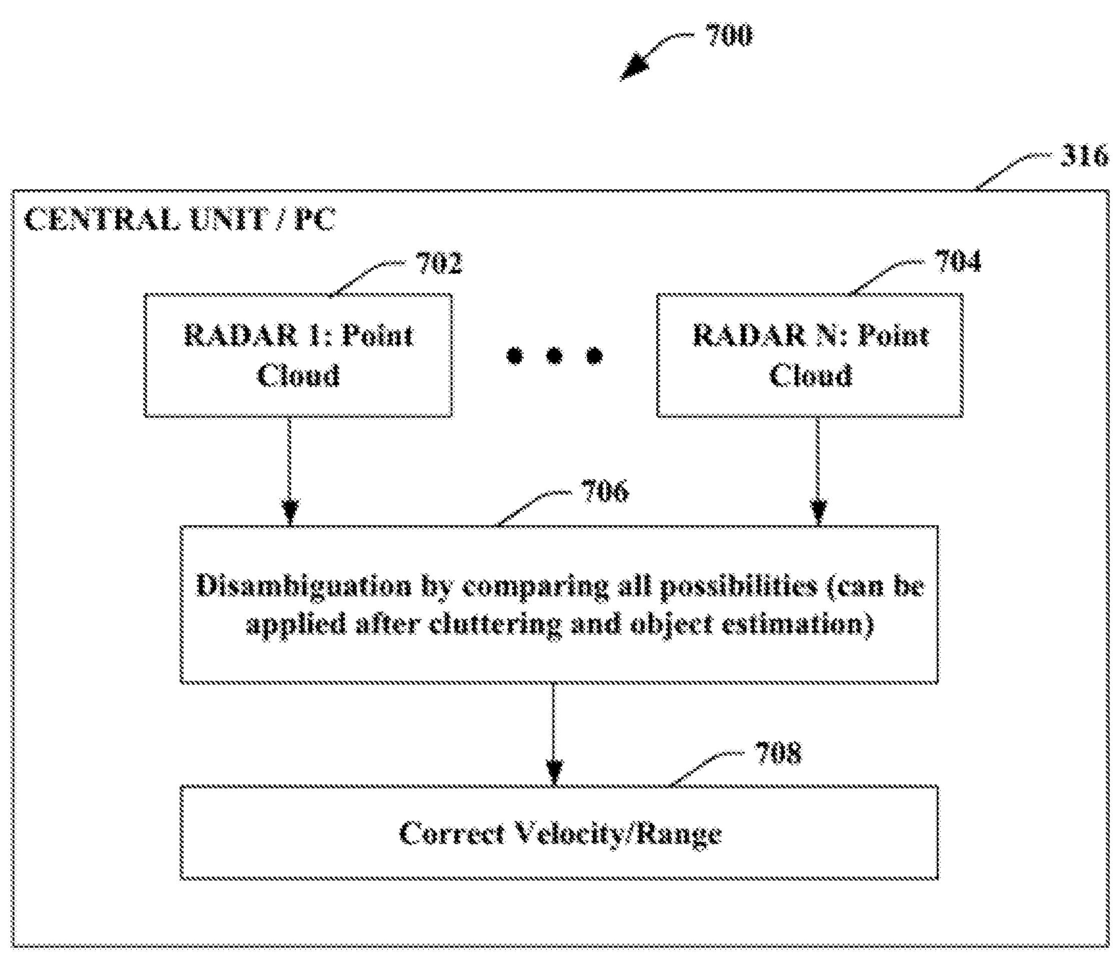
FIG. 7 illustrates another example of the processing performed by the central unit.

FIG. 7 illustrates another example of the processing performed by the central unit 316. Point cloud data 702 and 704 from respective radars 1 through N (see FIG. 5) has been received. The raw radar data can comprise, for example, data from the ADCs of the respective radar sensors, as well as range and Doppler data from the respective radar sensors. At 706, velocity and/or range disambiguation is performed by the central unit 316 by comparing values in the respective radars' vectors and identifying a value common to both radars' velocity vectors or range vectors. In a distributed aperture radar network, the disambiguation can be applied before the angle estimation. In one embodiment, the disambiguation is performed after cluttering and object estimation. At 708, the correct velocity and/or range is output.

Figure 8:
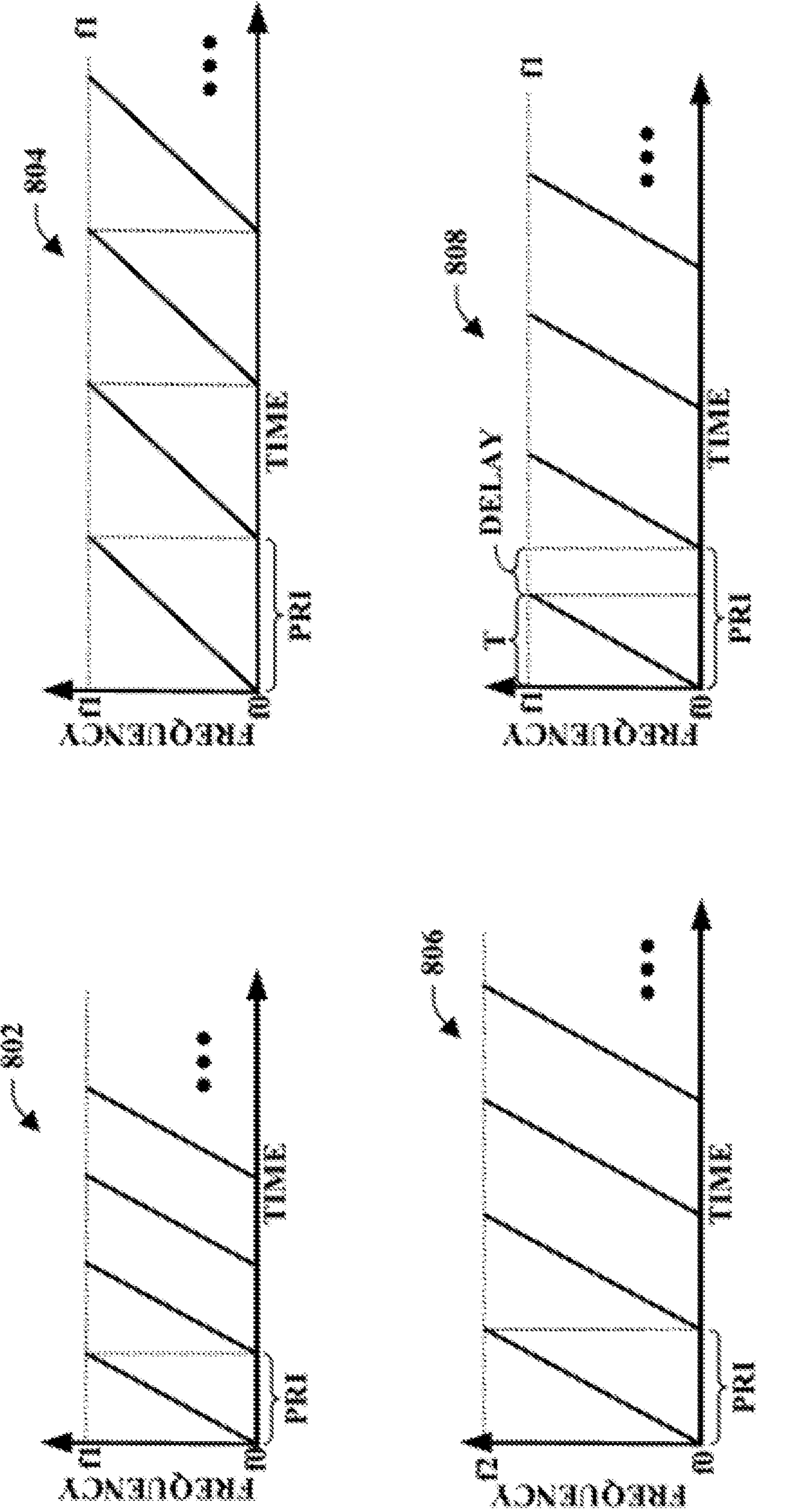
FIG. 8 illustrates several different ramp/pulse patterns having different PRIs for velocity disambiguation.

FIG. 8 illustrates several different ramp/pulse patterns having different PRIs, which can be employed to ensure that the different radars on the radar network use different PRIs for velocity disambiguation. The first pattern 802 shows a sawtooth signal having a first PRI, where each ramp increases from a first frequency f0 to a second frequency f1 that is higher than the first frequency. In other embodiments, a reverse sawtooth signal pattern can be used, where the ramps start at a higher frequency and decrease down to a lower frequency. Other signal waveforms are also contemplated, as will be understood by those of skill in the art.

Signal pattern 804 exhibits a sawtooth pattern of ramps wherein the slope of the ramps has been decreased in order to increase the PRI relative to the pattern 802. In similar fashion, the slope of each ramp can be increased in order to decrease the PRI.

Signal pattern 806 exhibits a sawtooth pattern wherein the bandwidth traversed by each ramp has been increased to a third frequency f2, where f2 is higher than f1. In this manner, the PRI can be increased relative to the PRI of pattern 802. It will be understood that f2 can be set to be lower than f1 in order to decrease the PRI relative to the pattern 802.

Signal pattern 808 illustrates another manner in which PRI can be adjusted or manipulated. In this example, a delay has been added after the end of each ramp and before the beginning of each subsequent ramp in order to increase the PRI relative to the pattern 802. In this case, the PRI is larger than the signal period T.

The different signal patterns of FIG. 8 are provided to illustrate different manners in which PRI may be adjusted so that the one or more MIMO radars of the radar networks described herein have differing PRIs in order to facilitate velocity and/or range disambiguation. These examples are illustrative in nature and not to be construed in a limiting sense.

Figure 9:
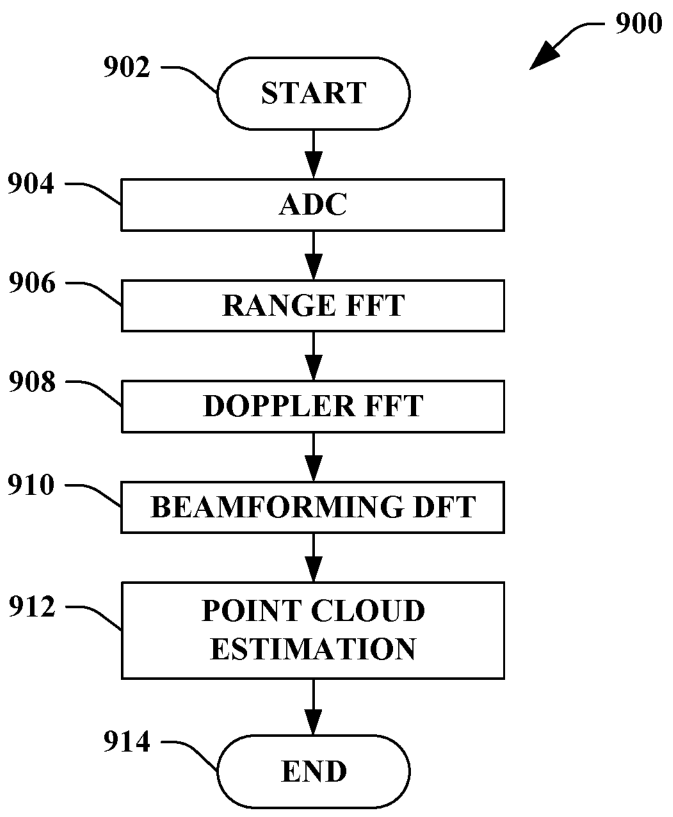
FIG. 9 illustrates a methodology for generating a radar point cloud for use in velocity and/or range disambiguation.
Figure 10:
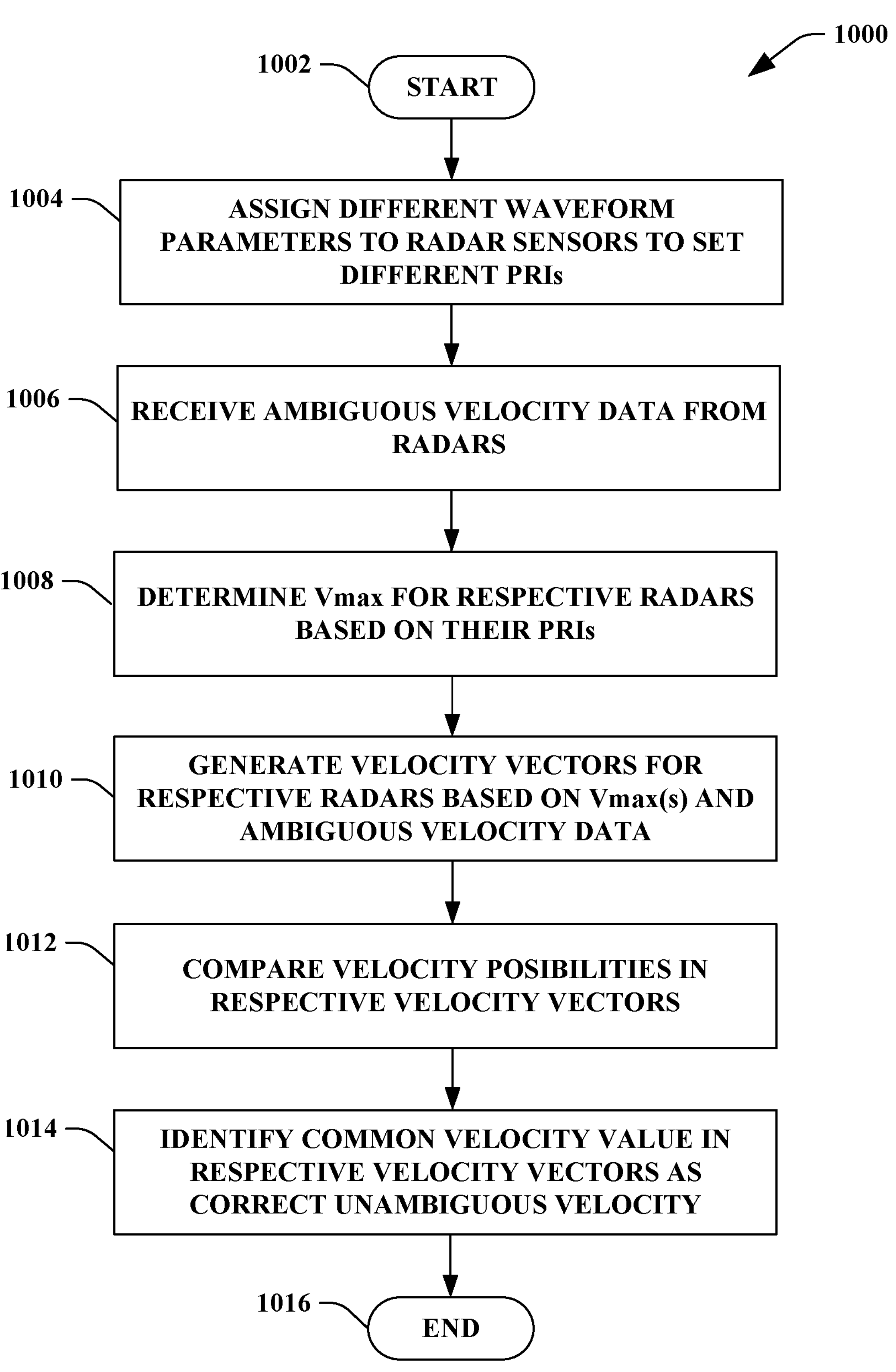
FIG. 10 illustrates a methodology for determining an unambiguous velocity value for a target object detected by first and second (or more) MIMO radar sensors having and overlapping FOV in a radar network.
Figure 11:
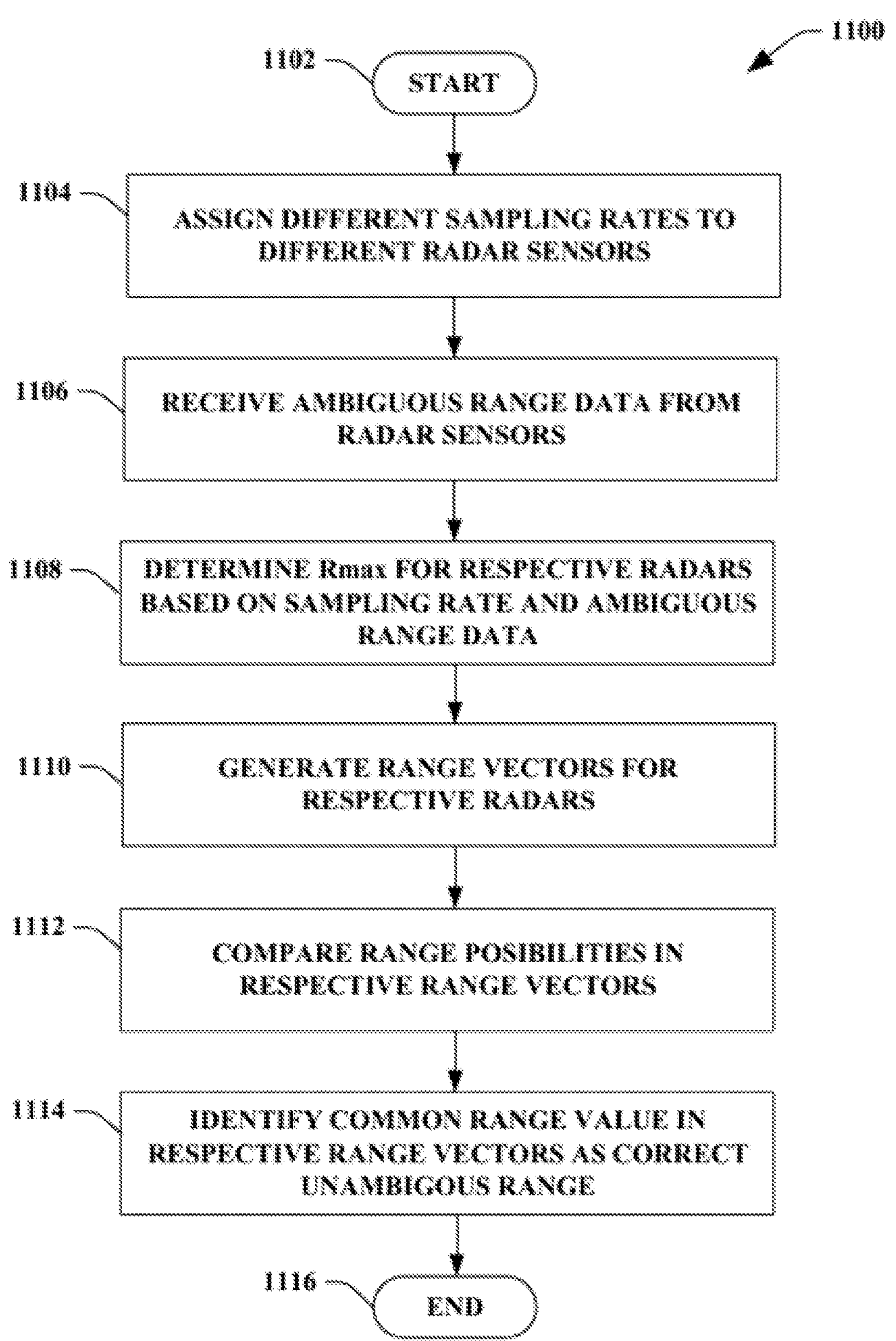
FIG. 11 illustrates a methodology for determining an unambiguous range value for a target object.

FIGS. 9-11 illustrate exemplary methodologies relating to determining unambiguous velocity and/or range values using two or more MIMO radar sensors with overlapping FOV. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Turning now solely to FIG. 9, a methodology 900 is illustrated for generating a radar point cloud for use in velocity and/or range disambiguation. At 902, the method begins. At 904, at a given radar sensor, analog to digital conversion is performed on each signal acted by target object and received by the sensor. This step is performed for each array element (e.g., Tx/Rx pair). Once the received signals have been digitized, then at 906, a range fast Fourier transform is executed thereon to generate range data for the detected object. At 908, a Doppler fest for your transform is executed on the range data in order to generate range and Doppler data. At 910, a beamforming discrete Fourier transform is executed on the range and Doppler data to generate elevation and azimuth data. At 912 the range data, the range and Doppler data, and the elevation and azimuth data are used for point cloud estimation. The method terminates at 914. The point cloud is then provided to the central unit 316 for velocity and/or range disambiguation.

FIG. 10 illustrates a methodology 1000 for determining an unambiguous velocity value for a target object detected by first and second (or more) MIMO radar sensors having and overlapping FOV in a radar network. At 1002, the method begins. At 1004, each radar sensor in the network is assigned different waveform parameters in order to set a different PRI for each radar sensor. At 1006, ambiguous velocity data is received from the first and second radar sensors. At 1008, a Vmax is determined for the first and second radar sensors. The Vmax for the first radar sensor is different from the Vmax for the second radar sensor due to the differing PRIs assigned to the first and second radar sensors. At 1010, a velocity vector is generated for each of the first and second sensors based on their respective Vmax. At 1012, velocity values represented in the velocity vector for the first sensor are compared to velocity values represented in the velocity vector for the second sensor. And 1014 velocity value that is common to both velocity vectors is identified as the correct unambiguous velocity of the object. At 1016, the method terminates.

FIG. 11 illustrates a methodology 1100 for determining an unambiguous range value for a target object detected by first and second (or more) MIMO radar sensors having and overlapping FOV in a radar network. At 1102, the method begins. At 1104, different sampling rates are assigned to the ADCs of the respective radar sensors. At 1106, ambiguous range data is received from the radar sensors. Due to the different sampling rates of the ADCs of the respective radar sensors, the ambiguous range of values will be different. At 1108 the maximum range (Rmax) is determined for the respective radar sensors based on their sampling rates and the ambiguous range data generated by each radar sensor. At 1110, range vectors are generated for the respective radar sensors based on each sensor's Rmax and ambiguous range data value. At 1112, range possibilities in respective range of vectors are compared. At 1114, a range value that is common to each radars range factor is identified as the correct unambiguous range value. At 1116, the method terminates.

Figure 12:
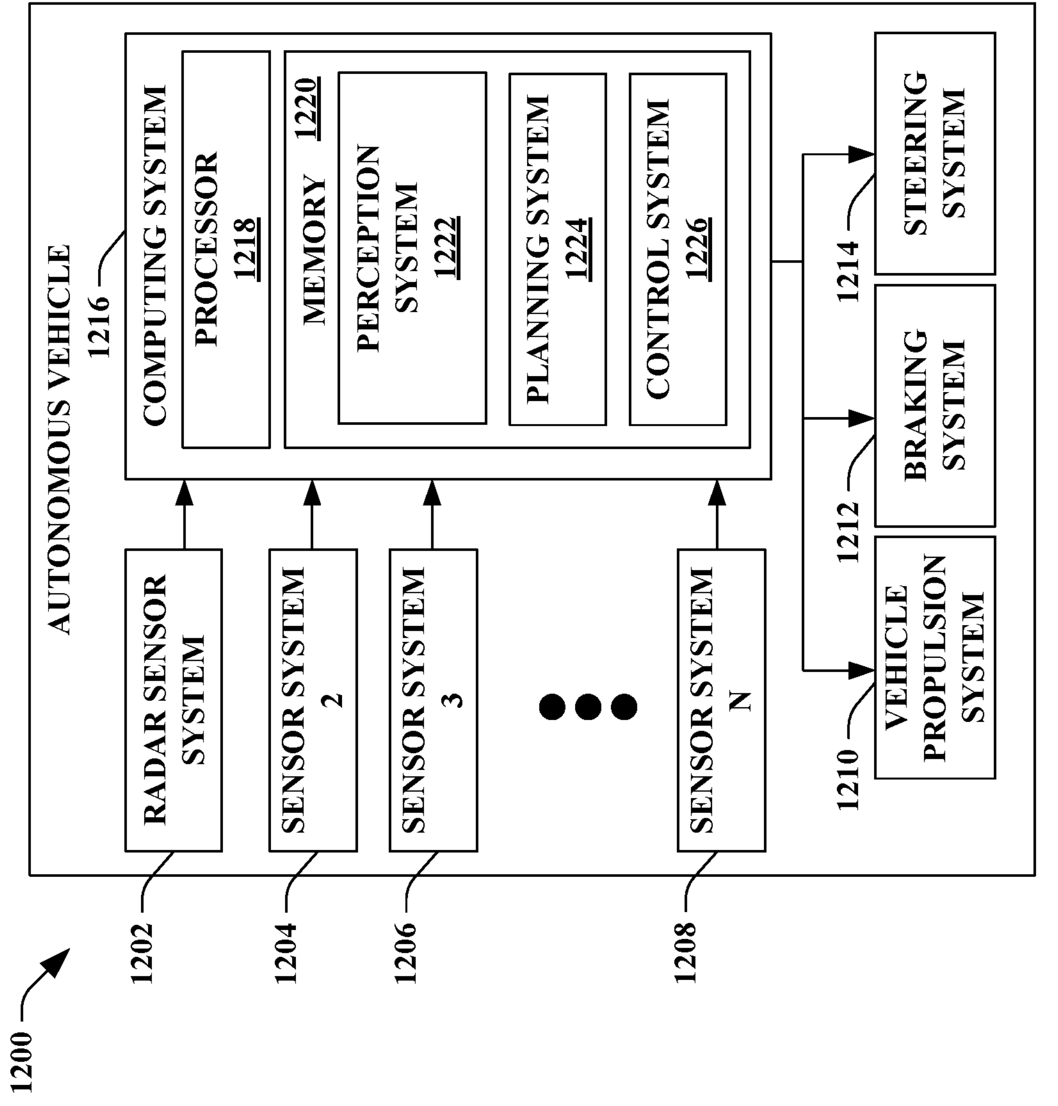
FIG. 12 is a functional block diagram of an exemplary AV.

Various technologies described herein are suitable for use in connection with an autonomous vehicle (AV) that employs a radar sensor system to facilitate navigation about roadways. Referring now to FIG. 12, an exemplary AV 1200 is illustrated, wherein the AV 1200 can navigate about roadways without human conduction based upon sensor signals output by sensor systems of the AV 1200. The AV 1200 includes a plurality of sensor systems 1202-1208 (a first sensor system 1202 through an Nth sensor system 1208). The sensor systems 1202-1208 may be of different types. For example, the first sensor system 1202 is a radar sensor system, the second sensor system 1204 may be a LiDaR sensor system, the third sensor system 1206 may be a camera (image) system, and the Nth sensor system 1208 may be a sonar system. Other exemplary sensor systems include GPS sensor systems, inertial sensor systems, infrared sensor systems, and the like. The various sensor systems 1202-1208 are arranged about the AV 1200. The sensor systems 1202-1208 are configured to repeatedly (e.g., continuously, or periodically) output sensor data that is representative of objects and conditions in the driving environment of the AV 1200.

The AV 1200 further includes several mechanical systems that are used to effectuate appropriate motion of the AV 1200. For instance, the mechanical systems can include but are not limited to, a vehicle propulsion system 1210, a braking system 1212, and a steering system 1214. The vehicle propulsion system 1210 may be an electric engine, an internal combustion engine, or a combination thereof. The braking system 1212 can include an engine brake, brake pads, actuators, a regenerative braking system, and/or any other suitable componentry that is configured to assist in decelerating the AV 1200. The steering system 1214 includes suitable componentry that is configured to control the direction of movement of the AV 1200.

The AV 1200 additionally comprises a computing system 1216 that is in communication with the sensor systems 1202-1208 and is further in communication with the vehicle propulsion system 1210, the braking system 1212, and the steering system 1214. The computing system 1216 includes a processor 1218 and memory 1220 that includes computer-executable instructions that are executed by the processor 1218. In an example, the processor 1218 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 1220 comprises a perception system 1222, a planning system 1224, and a control system 1226. Briefly, the perception system 1222 is configured to identify the presence of objects and/or characteristics of objects in the driving environment of the AV 1200 based upon sensor data output by the sensor systems 1202-1208. The planning system 1224 is configured to plan a route and/or a maneuver of the AV 1200 based upon data pertaining to objects in the driving environment that are output by the perception system 1222. The control system 1226 is configured to control the mechanical systems 1212-1214 of the AV 1200 to effectuate appropriate motion to cause the AV 1200 to execute a maneuver planned by the planning system 1224.

The perception system 1222 is configured to identify objects in proximity to the AV 1200 that are captured in sensor signals output by the sensor systems 1202-1208. By way of example, the perception system 1222 can be configured to identify the presence of an object in the driving environment of the AV 1200 based upon images generated by a camera system included in the sensor systems 1204-1208. In another example, the perception system 1222 can be configured to determine a presence and position of an object based upon radar data output by the radar sensor system 1202. In exemplary embodiments, the radar sensor system 1202 can be or include the radar sensor 100 and/or 300. In such embodiments, the perception system 1222 can be configured to identify a position of an object in the driving environment of the AV 1200 based upon the estimated range output by the radar sensor 100 and/or 300.

The AV 1200 can be included in a fleet of AVs that are in communication with a common server computing system. In these embodiments, the server computing system can control the fleet of AVs such that radar sensor systems of AVs operating in a same driving environment (e.g., within line of sight of one another, or within a threshold distance of one another) employ different pulse sequence carrier frequencies. In an exemplary embodiment, a radar sensor system of a first AV can be controlled so as not to transmit pulse sequences having same center frequencies as pulse sequences transmitted by a radar sensor system of a second AV at the same time. In further embodiments, the radar sensor system of the first AV can be controlled to transmit pulse sequences in a different order than a radar sensor system of a second AV. For instance, the radar sensor system of the first AV can be configured to transmit a set of pulse sequences at four different center frequencies A, B, C, and D in an order A, B, C, D. The radar sensor system of the second AV can be configured to transmit pulse sequences using a same set of center frequencies in a frequency order B, A, D. C. Such configurations can mitigate the effects of interference when multiple AVs that employ radar sensor systems are operating in a same driving environment.

Figure 13:
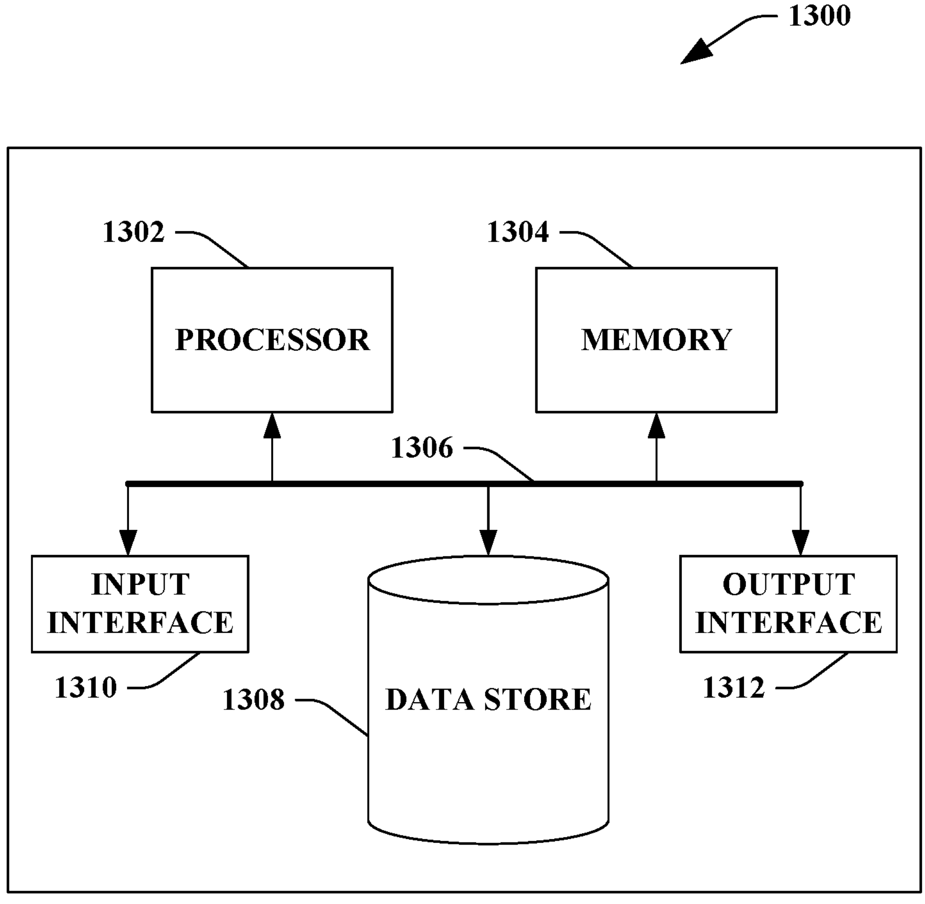
FIG. 13 is an exemplary computing system.

Referring now to FIG. 13, a high-level illustration of an exemplary computing device 1300 that can be used in accordance with the systems and methodologies disclosed herein is illustrated. For instance, the computing device 1300 may be or include the computing system 1216. The computing device 1300 includes at least one processor 1302 that executes instructions that are stored in a memory 1304. The instructions may be, for instance, instructions for implementing functionality described as being carried out by one or more modules, components, or systems discussed above or instructions for implementing one or more of the methods described above. The processor 1302 may be a GPU, a plurality of GPUs, a CPU, a plurality of CPUs, a multi-core processor, a combination of the foregoing, etc. The processor 1302 may access the memory 1304 by way of a system bus 1306. In addition to storing executable instructions, the memory 1304 may also store radar data, beamformed radar data, neural network configurations, etc.

The computing device 1300 additionally includes a data store 1308 that is accessible by the processor 1302 by way of the system bus 1306. The data store 1308 may include executable instructions, radar data, beamformed radar data, embeddings of these data in latent spaces, etc. The computing device 1300 also includes an input interface 1310 that allows external devices to communicate with the computing device 1300. For instance, the input interface 1310 may be used to receive instructions from an external computing device, etc. The computing device 1300 also includes an output interface 1312 that interfaces the computing device 1300 with one or more external devices. For example, the computing device 1300 may transmit control signals to the vehicle propulsion system 1210, the braking system 1212, and/or the steering system 1214 by way of the output interface 1312.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), SOCs, Complex Programmable Logic Devices (CPLDs), etc.

Described herein are various technologies according to at least the following examples.

(A1) In an aspect, a method performed by a radar sensor system includes assigning a first pulse rate interval (PRI) to a first radar sensor in the radar sensor system. The method further includes assigning a second PRI to a second radar sensor in the radar sensor system. The method also includes, receiving, for an object detected by the first and second radar sensors, a first ambiguous velocity estimate from the first radar sensor, and a second ambiguous velocity estimate from the second radar sensor. Additionally, the method includes determining a first maximum detectable velocity (Vmax) for the first radar sensor based on the first PRI, and determining a second Vmax for the second radar sensor based on the second PRI. Furthermore, the method includes generating a first velocity vector for the first radar sensor based on the first Vmax and the first ambiguous velocity estimate, and generating a second velocity vector for the second radar sensor based on the second Vmax and the second ambiguous velocity estimate. The method also includes comparing velocity values in the first velocity vector to velocity values in the second velocity vector. The method further includes identifying and outputting a velocity value that is common to the first and second velocity vectors as a correct unambiguous velocity of the object.

(A2) In some embodiments of the method of (A1), the method further includes generating the first and second velocity vectors comprises, determining a first Vmax range that is double the first Vmax value, and determining a second Vmax range that is double the second Vmax value.

(A3) In some embodiments of the method of at least one of (A1)-(A2), generating the first and second velocity vectors further includes: generating a first set of possible velocity values adding and subtracting multiples of the first Vmax range to the first ambiguous velocity estimate and including the first set of possible velocity values in the first velocity vector; and generating a second set of possible velocity values adding and subtracting multiples of the second Vmax range to the second ambiguous velocity estimate and including the second set of possible velocity values in the second velocity vector.

(A4) In some embodiments of the method of at least one of (A1)-(A3), the first and second radar sensors have overlapping fields of view in which the object is concurrently detected by the first and second radar sensors.

(A5) In some embodiments of the method of at least one of (A1)-(A4), the first and second radar sensors are deployed on an autonomous vehicle.

(A6) In some embodiments of the method of at least one of (A1)-(A5), the first and second ambiguous velocity estimates are received as at least one of raw radar data and point cloud data.

(A7) In some embodiments of the method of at least one of (A1)-(A6), the first and second radar sensors are at least one of multiple input-multiple output (MIMO) radar sensors, orthogonal frequency division modulated (OFDM) radar sensors, and frequency modulated continuous wave (FMCW) radar sensors.

(B1) In another aspect, a radar system is configured to perform at least one of the methods disclosed herein (e.g., any of the methods of (A1)-(A7)).

(C1) In yet another aspect, a radar system includes a hardware logic component (e.g., circuitry), where the hardware logic component is configured to control elements of a radar system to perform at least one of the methods disclosed herein (e.g., any of the methods of (A1)-(A7)).

(D1) In still yet another aspect, a radar sensor system includes a first radar sensor and at least a second radar sensor. The radar sensor system further includes one or more processors configured to perform certain acts, including assigning a first pulse rate interval (PRI) to the first radar sensor. The acts further include assigning a second PRI to the second radar sensor. The axe also include receiving, for an object detected by the first and second radar sensors, a first ambiguous velocity estimate from the first radar sensor, and a second ambiguous velocity estimate from the second radar sensor. Additionally, the acts include determining a first maximum detectable velocity (Vmax) for the first radar sensor based on the first PRI, and determining a second Vmax for the second radar sensor based on the second PRI. Furthermore, the acts include generating a first velocity vector for the first radar sensor based on the first Vmax and the first ambiguous velocity estimate, and generating a second velocity vector for the second radar sensor based on the second Vmax and the second ambiguous velocity estimate. The X also include comparing velocity values in the first velocity vector to velocity values in the second velocity vector. The acts further include identifying and outputting a velocity value that is common to the first and second velocity vectors as a correct unambiguous velocity of the object.

(D2) In some embodiments of the radar sensor system of (D1), the act of generating the first and second velocity vectors includes the acts of: determining a first Vmax range that is double the first Vmax value; and determining a second Vmax range that is double the second Vmax value.

(D3) In some embodiments of the radar sensor system of at least one of (D1)-(D2), generating the first and second velocity vectors further includes: generating a first set of possible velocity values adding and subtracting multiples of the first Vmax range to the first ambiguous velocity estimate and including the first set of possible velocity values in the first velocity vector; and generating a second set of possible velocity values adding and subtracting multiples of the second Vmax range to the second ambiguous velocity estimate and including the second set of possible velocity values in the second velocity vector.

(D4) In some embodiments of the radar sensor system of at least one of (D1)-(D3), the first and second radar sensors have overlapping fields of view in which the object is concurrently detected by the first and second radar sensors.

(D5) In some embodiments of the radar sensor system of at least one of (D1)-(D4), the first and second radar sensors are deployed on an autonomous vehicle.

(D6) In some embodiments of the radar sensor system of at least one of (D1)-(D5), the first and second ambiguous velocity estimates are received as at least one of raw radar data and point cloud data.

(D7) In some embodiments of the radar sensor system of at least one of (D1)-(D6), the first and second radar sensors are at least one of multiple input-multiple output (MIMO) radar sensors, orthogonal frequency division modulated (OFDM) radar sensors, and frequency modulated continuous wave (FMCW) radar sensors.

(E1) In another aspect, a central processing unit includes a computer-readable medium having stored thereon instructions which, when executed by a processor, cause the processor to perform certain acts. The central processing unit also includes one or more processors configured to execute the instructions. The acts include assigning a first pulse rate interval (PRI) to a first radar sensor in a radar sensor system. The acts further include assigning a second PRI to a second radar sensor in the radar sensor system. The acts also include receiving, for an object detected by the first and second radar sensors, a first ambiguous velocity estimate from the first radar sensor, and a second ambiguous velocity estimate from the second radar sensor. Additionally, the acts include determining a first maximum detectable velocity (Vmax) for the first radar sensor based on the first PRI, and determining a second Vmax for the second radar sensor based on the second PRI. The acts further include generating a first velocity vector for the first radar sensor based on the first Vmax and the first ambiguous velocity estimate, and generating a second velocity vector for the second radar sensor based on the second Vmax and the second ambiguous velocity estimate. The acts also include comparing velocity values in the first velocity vector to velocity values in the second velocity vector. Moreover, the acts include identifying and outputting a velocity value that is common to the first and second velocity vectors as a correct unambiguous velocity of the object.

(E2) In some embodiments of the central processing unit (E1), generating the first and second velocity vectors includes: determining a first Vmax range that is double the first Vmax value; and determining a second Vmax range that is double the second Vmax value.

(E3) In some embodiments of the central processing unit of at least one of (E1)-(E2), generating the first and second velocity vectors further includes: generating a first set of possible velocity values adding and subtracting multiples of the first Vmax range to the first ambiguous velocity estimate and including the first set of possible velocity values in the first velocity vector; and generating a second set of possible velocity values adding and subtracting multiples of the second Vmax range to the second ambiguous velocity estimate and including the second set of possible velocity values in the second velocity vector.

(E4) In some embodiments of the central processing unit of at least one of (E1)-(E3), the first and second radar sensors have overlapping fields of view in which the object is concurrently detected by the first and second radar sensors.

(E5) In some embodiments of the central processing unit of at least one of (E1)-(E4), the first and second ambiguous velocity estimates are received as at least one of raw radar data and point cloud data.

(E6) In some embodiments of the central processing unit of at least one of (E1)-(E5), the first and second radar sensors are at least one of multiple input-multiple output (MIMO) radar sensors, orthogonal frequency division modulated (OFDM) radar sensors, and frequency modulated continuous wave (FMCW) radar sensors.

(F1) In still yet another aspect, use of any of the radar systems (e.g., any of (B1), (C1), (D1)-(D7) or (E1-E6)) to detect and classify a target is contemplated.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a radar system, the method comprising:
assigning a first pulse rate interval (PRI) to a first radar sensor in a radar network;
assigning a second PRI to a second radar sensor in the radar network;
receiving, for an object detected by the first and second radar sensors, a first ambiguous velocity estimate from the first radar sensor, and a second ambiguous velocity estimate from the second radar sensor;
determining a first maximum detectable velocity (Vmax) for the first radar sensor based on the first PRI, and determining a second Vmax for the second radar sensor based on the second PRI;
generating a first velocity vector for the first radar sensor based on the first Vmax and the first ambiguous velocity estimate, and generating a second velocity vector for the second radar sensor based on the second Vmax and the second ambiguous velocity estimate;
comparing velocity values in the first velocity vector to velocity values in the second velocity vector;
identifying a velocity value common to the first and second velocity vectors and outputting the velocity common to the first and second velocity vectors as a correct unambiguous velocity of the object; and
wherein signals transmitted from the first radar sensor in the sensor network and signals transmitted from the second radar sensor in the sensor network are transmitted at different times and wherein a transmission time difference between the signals is less than a possible range migration of the object during measurement.

2. The method of claim 1, generating the first and second velocity vectors comprises:
determining a first Vmax range that is double the first Vmax value; and
determining a second Vmax range that is double the second Vmax value.

3. The method of claim 2, wherein generating the first and second velocity vectors further comprises:
generating a first set of possible velocity values adding and subtracting multiples of the first Vmax range to the first ambiguous velocity estimate and including the first set of possible velocity values in the first velocity vector; and
generating a second set of possible velocity values adding and subtracting multiples of the second Vmax range to the second ambiguous velocity estimate and including the second set of possible velocity values in the second velocity vector.

4. The method of claim 1, wherein the first and second radar sensors have overlapping fields of view in which the object is concurrently detected by the first and second radar sensors.

5. The method of claim 1, wherein the first and second radar sensors are deployed on an automated vehicle.

6. The method of claim 1, wherein the first and second ambiguous velocity estimates are received as at least one of raw radar data and point cloud data.

7. The method of claim 1, wherein the first and second radar sensors are at least one of multiple input-multiple output (MIMO) radar sensors, orthogonal frequency division modulated (OFDM) radar sensors, and frequency modulated continuous wave (FMCW) radar sensors.

8. A radar system comprising:

a first radar sensor and at least a second radar sensor;

one or more processors configured to:

assign a first pulse rate interval (PRI) to the first radar sensor;

assign a second PRI to the second radar sensor;

receive, for a object detected by the first and second radar sensors, a first ambiguous velocity estimate from the first radar sensor, and a second ambiguous velocity estimate from the second radar sensor;

determine a first maximum detectable velocity (Vmax) for the first radar sensor based on the first PRI, and determine a second Vmax for the second radar sensor based on the second PRI;

generate a first velocity vector for the first radar sensor based on the first Vmax and the first ambiguous velocity estimate, and generate a second velocity vector for the second radar sensor based on the second Vmax and the second ambiguous velocity estimate;

compare velocity values in the first velocity vector to velocity values in the second velocity vector;

identify and output a velocity value that is common to the first and second velocity vectors as a correct unambiguous velocity of the object; and wherein signals transmitted from the first radar sensor in the sensor network and signals transmitted from the second radar sensor in the sensor network are transmitted at different times and wherein a transmission time difference between the signals is less than a possible range migration of the object during measurement.

9. The radar system of claim 8, wherein generating the first and second velocity vectors comprises:

determining a first Vmax range that is double the first Vmax value; and determining a second Vmax range that is double the second Vmax value.

10. The radar system of claim 9, wherein generating the first and second velocity vectors further comprises:

generating a first set of possible velocity values adding and subtracting multiples of the first Vmax range to the first ambiguous velocity estimate and including the first set of possible velocity values in the first velocity vector; and generating a second set of possible velocity values adding and subtracting multiples of the second Vmax range to the second ambiguous velocity estimate and including the second set of possible velocity values in the second velocity vector.

11. The radar system of claim 8, wherein the first and second radar sensors have overlapping fields of view in which the object is concurrently detected by the first and second radar sensors.

12. The radar system of claim 8, wherein the first and second radar sensors are deployed on an automated vehicle.

13. The radar system of claim 8, wherein the first and second ambiguous velocity estimates are received as at least one of raw radar data and point cloud data.

14. The radar system of claim 8, wherein the first and second radar sensors are at least one of multiple input-multiple output (MIMO) radar sensors, orthogonal frequency division modulated (OFDM) radar sensors, and frequency modulated continuous wave (FMCW) radar sensors.

15. A central processing unit comprising:

a computer-readable medium having stored thereon instructions which, when executed by a processor, cause the processor to perform certain acts;

one or more processors configured to execute the instructions, the acts comprising:

assigning a first pulse rate interval (PRI) to a first radar sensor in a radar network;

assigning a second PRI to a second radar sensor in the radar network;

receiving, for a object detected by the first and second radar sensors, a first ambiguous velocity estimate from the first radar sensor, and a second ambiguous velocity estimate from the second radar sensor;

determining a first maximum detectable velocity (Vmax) for the first radar sensor based on the first PRI, and determining a second Vmax for the second radar sensor based on the second PRI;

generating a first velocity vector for the first radar sensor based on the first Vmax and the first ambiguous velocity estimate, and generating a second velocity vector for the second radar sensor based on the second Vmax and the second ambiguous velocity estimate;

comparing velocity values in the first velocity vector to velocity values in the second velocity vector;

identifying and outputting a velocity value that is common to the first and second velocity vectors as a correct unambiguous velocity of the object; and wherein signals transmitted from the first radar sensor in the sensor network and signals transmitted from the second radar sensor in the sensor network are transmitted at different times and wherein a transmission time difference between the signals is less than a possible range migration of the object during measurement.

16. The central processing unit of claim 15, wherein generating the first and second velocity vectors comprises:

determining a first Vmax range that is double the first Vmax value; and determining a second Vmax range that is double the second Vmax value.

17. The central processing unit of claim 16, wherein generating the first and second velocity vectors further comprises:

generating a first set of possible velocity values adding and subtracting multiples of the first Vmax range to the first ambiguous velocity estimate and including the first set of possible velocity values in the first velocity vector; and generating a second set of possible velocity values adding and subtracting multiples of the second Vmax range to the second ambiguous velocity estimate and including the second set of possible velocity values in the second velocity vector.

18. The central processing unit of claim 15, wherein the first and second radar sensors have overlapping fields of view in which the object is concurrently detected by the first and second radar sensors.

19. The central processing unit of claim 15, wherein the first and second ambiguous velocity estimates are received as at least one of raw radar data and point cloud data.

20. The central processing unit of claim 15, wherein the first and second radar sensors are at least one of multiple input-multiple output (MIMO) radar sensors, orthogonal frequency division modulated (OFDM) radar sensors, and frequency modulated continuous wave (FMCW) radar sensors.

* * * * *